June 15, 1954 E. M. CREAMER, JR 2,681,381

ELECTRICAL SYSTEM

Filed Nov. 15, 1951 2 Sheets-Sheet 1

INVENTOR
EDGAR M. CREAMER, JR.
BY Allen V. Hazeltine
ATTORNEY

June 15, 1954 E. M. CREAMER, JR 2,681,381

ELECTRICAL SYSTEM

Filed Nov. 15, 1951 2 Sheets-Sheet 2

INVENTOR
EDGAR M. CREAMER, JR.
BY
Allen V. Hazeltine
ATTORNEY

Patented June 15, 1954

2,681,381

UNITED STATES PATENT OFFICE 2,681,381

ELECTRICAL SYSTEM

Edgar M. Creamer, Jr., Philadelphia, Pa., assignor to Philco Corporation, Philadelphia, Pa., a corporation of Pennsylvania Application November 15, 1951, Serial No. 256,526

13 Claims. (Cl. 178—5.4)

The present invention relates to television systems and more particularly to receiving systems for producing color television images.

The invention is particularly adapted for and will be described in connection with, a color television image presentation system utilizing a single cathode-ray tube having a beam-intercepting, image-forming screen member comprising vertical stripes of luminescent materials. These stripes are preferably arranged in laterally-displaced color triplets, each triplet comprising three vertical phosphor stripes which respond to electron impingement to produce light of the different primary colors. The order of arrangement of the stripes may be such that the normally horizontally-scanning cathode-ray beam produces red, green and blue light successively. From a color television receiver there may then be supplied a video color wave having signal components definitive of the brightness and chromaticity of the image to be reproduced, which wave is utilized to control the intensity of the cathode-ray beam to the required instantaneous value as the beam scans the phosphor stripes.

The video color wave may be generated at the transmitter by means of appropriate camera units producing three signals indicative of three color-specifying parameters of successively scanned elements of a televised scene. These three signals may be such as to specify the image colors with respect to three color primaries "X," "Y" and "Z" as defined by the International Commission on Illumination (ICI). With this choice of primaries, the Y signal represents the brightness of the image as perceived by the human eye, while the X and Z signals contain the remaining intelligence as to image color. Since the specification of any color in terms of any given set of primaries may be converted to a specification of the same color in terms of any other set of primaries by means of simple linear transformations, the transmission of the X, Y and Z signals makes available at the receiver all of the required information necessary to excite the three real primary-color sources of the image reproducing cathode-ray tube.

In a preferred arrangement for segregating and apportioning the intelligence concerning the X, Y and Z components of the color image at the transmitter, these components are combined to form two difference signals (X–Y) and (Z–Y) which are transmitted in different phase relations as amplitude-modulation of a sub-carrier signal. The Y signal is then transmitted in the frequency band located below that of the modulated sub-carrier. The modulation of the sub-carrier is preferably effected by means of balanced modulators, so that no sub-carrier signal is generated when the difference signals (X–Y) and (Z–Y) are zero, i. e., when image elements are white or gray are scanned. However, when colored image elements are scanned, either or both of the difference signals (X–Y) and (Z–Y) will differ from zero, producing a sub-carrier signal having a phase determined by the relative values of the difference signals and hence by the hue of the image, and an amplitude determined by the absolute values of the difference signals and hence by the saturation of the image color. The modulated sub-carrier signal therefore may be considered as a chromaticity signal having a phase and amplitude representative of the hue and saturation respectively, of the color of the image.

Alternatively, the three signals indicative of the three color specifying parameters of successively scanned elements of the televised scene may be such as to specify the brightness and chromaticity of the image in terms of the primary colors of a specific primary color system. More particularly, a signal approximately proportional to the brightness of the televised scene, hereinafter to be referred to as M, may be generated at the transmitter by combining three signals proportional to specific red, green and blue primary color components of the colors of the successively scanned image elements. Such a signal may have a value determined by $$\frac{R+G+B}{3}$$

where R, G and B represent the intensity of the red, green and blue primary color components of the successively scanned image elements. Two additional signals N and O, complementary to M and defining with the signal M the color of the image elements, may be generated either by appropriately combining the R, G and B signals or by a matrix modification of the ICI primaries above referred to.

In a preferred arrangement at the transmitter the M, N and O components are combined to form two difference signals, (N–M) and (O–M), which are transmitted in respectively different phase relations as amplitude modulation of a sub-carrier signal in a manner similar to that above described in connection with the component signals X, Y and Z.

The instantaneous amplitude value of the video signal will be a function of the magnitudes of the three components thereof and of the absolute phase positions of the two components constituting the modulated sub-carrier signal, and at any given instant the amplitude value is indicative of the intensity of one of the primary color constituents of an element of the image to be reproduced. For proper color rendition, it is required that, as the phosphor stripe producing a given one of the primary colors of light of a particular image element is impinged by the cathode-ray beam, the intensity of the beam be simultaneously controlled in response to the contemporaneous value of the video signal representing the corresponding color component of the televised image. However, since the rate at which the beam scans across the phosphor stripes of the screen may vary, due, for example, to non-linearity of the beam deflecting signal, or due to a non-uniform distribution of the color triplets on the screen surface, a phase synchronous relationship between the signal applied to the intensity control system of the beam and the scanning of the beam must be continuously reestablished. Such a synchronous relationship may be maintained throughout the scanning cycle by deriving indexing signals indicative of the instantaneous position of the cathode-ray beam upon the image-forming screen, and by utilizing these signals to control the relative phase of the video wave. The said indexing signals may be derived from a plurality of stripe members arranged on the beam intercepting screen structure in a geometric configuration indicative of the configuration of the color triplets so that, when the beam scans the screen, the indexing stripes are excited in spaced time sequence relative to the scanning of the color triplets and a series of pulses is generated in a suitable output electrode system of the cathode-ray tube.

The indexing stripes may comprise a material having secondary-emissive properties which differ from the secondary-emissive properties of the remaining portions of the beam intercepting structure. For example, the indexing stripes may consist of a high atomic number material such as gold, platinum or tungsten or may consist of certain oxides such as magnesium oxide. The remainder of the beam intercepting structure may be provided with a coating of a material having a detectably different secondary-emissive ratio, such as aluminum, which coating also serves as a light reflecting mirror for the phosphor stripes in accordance with well known practice. With such an arrangement the indexing signals may be derived from a collector electrode arranged in the vicinity of the screen structure. Alternatively, the indexing stripes may consist of a fluorescent material, such as zinc oxide, having a spectral output in the non-visible light region and the indexing signals may be derived from a suitable photo-electric cell arranged, for example, in a side wall portion of the cathode-ray tube out of the path of the cathode-ray beam and facing the beam intercepting surface of the screen structure.

In the copending application of E. M. Creamer, Jr., et al., Ser. No. 240,325, filed August 4, 1951, there have been described systems by means of which the desired indexing information may be obtained in a readily usable form. More particularly, and in accordance with the principles set forth in the said copending application, use is made of the finding that the scanning of the indexing stripes by the electron beam will produce, in the collector circuit of the cathode-ray tube, signal components which represent modulation products as determined by the intensity variations of the beam and the rate of scanning of the index stripes. Accordingly, by additionally varying the intensity of the beam at a pilot carrier frequency rate different from the rate at which the beam intensity is varied by the video signal, an output signal is produced in the collector electrode of the cathode-ray tube comprising, as one component, modulation products proportional to the pilot carrier frequency and the rate of scanning the index stripes. Because the frequencies of these modulation products are widely different from the frequencies of any modulation products brought about by the video signal variations of the beam, the former can be readily separated from the latter by relatively simple frequency discriminating means. These pilot carrier modulation products consist essentially of a carrier wave at the pilot carrier frequency and sidebands representing the sum and difference of the pilot carrier frequency and the rate of scanning the index stripes. Since any change in the rate of scanning of the index stripes will be indicated by a change in the frequencies of the sidebands, the modulated pilot carrier signal or one of its sidebands may be used as an indexing control signal of high quality.

In the heretofore proposed receiving systems, it has been the practice to derive the video wave from a carrier wave detector and thereafter supply the detected wave to a demodulation system by means of which three color signals indicative of the color components of successive image elements are produced. It was then required that the three color signals be processed by a suitable remodulation system to adapt these signals to the particular characteristics of the reproducer used. The number of components required to carry out the above noted functions is relatively large, and receivers embodying the same are costly and space consuming. Furthermore, because of the large number of circuits involved, the probability of unreliable operation is greatly increased, thereby making trouble free operation of the receiver relatively difficult.

It is an object of the invention to provide improved color television receiving systems leading to substantial savings in the number of circuit components required for producing a color television image.

A further object of the invention is to provide improved color television receivers having a high degree of reliability of operation.

A specific object of the invention is to provide a color television receiving system utilizing a single cathode-ray tube color image reproducer having simplified circuit requirements and having low cost and low-overall space requirements.

In accordance with the invention, the foregoing objects are achieved by novel circuit arrangements by means of which the low frequency component and the modulated sub-carrier component of the video information are derived from respectively different portions of the receiver whereby these components are separately and directly applied to the image reproducer with a minimum amount of modification being necessary to adapt them to the characteristics of the image reproducer. More specifically, and in accordance with the invention, the low frequency component of the video information is derived from the intermediate frequency amplifier of the receiver through a suitable carrier detector and applied to the image reproducer by means of an individual channel. The modulated sub-carrier component of the video information is derived from the intermediate frequency amplifier independently of the low frequency component, and at a point prior to the carrier detector. The so derived modulated sub-carrier is processed in a separate channel and, by means of a heterodyne system in this channel, this portion of the video information is directly adapted to the requirements of the image reproducer. I have found that, by so processing the video information, the need for the demodulation and remodulation processes heretofore required is avoided with the result that the circuitry of the receiver is considerably simplified.

As a further feature of the system of the invention, the control signal for assuring absolute synchronization between the times of occurrence of the color information and the scanning position of the beam of the image reproducer is similarly derived directly from the intermediate frequency amplifier of the receiver without prior detection, thereby further simplifying the receiver circuitry.

The invention will be described in greater detail with reference to the appended drawings forming part of the specification and in which.

Figure 1:
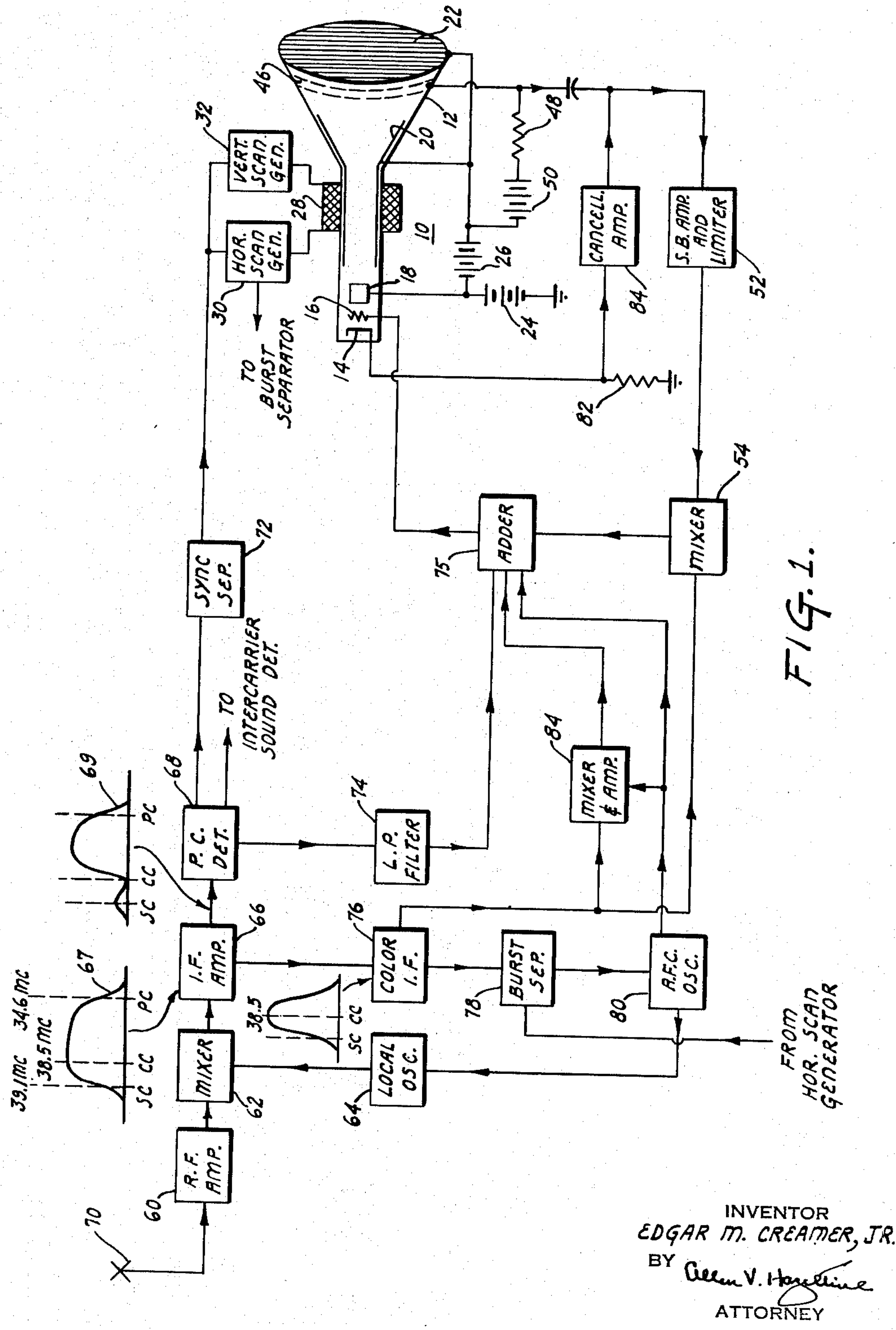
Figure 1 is a block diagram of a color television receiving system in accordance with the invention.

Referring to Figure 1, the color television receiving system shown therein, comprises a cathode-ray tube color image reproducer 10 containing, within an evacuated envelope 12, a conventionally constructed beam generating and accelerating electrode system comprising a cathode 14, a control electrode 16 for varying the intensity of the beam, a focussing electrode 18, and a beam accelerating electrode 20 which may consist of a conductive coating on the inner wall of the envelope and which terminates at a point spaced from the end face 22 of the tube in conformance with well-established practice. Suitable heating means (not shown) are provided for maintaining the cathode 14 at its operating temperature. The electrode system so defined is energized by a suitable source of potential shown as batteries 24 and 26; the battery 24 having its negative pole connected to ground and its positive pole connected to the electrode 18, and the battery 26 having its negative pole connected to the positive pole of the battery 24 and its positive pole connected to the accelerating electrode 20. In practice the battery 24 has a potential of the order of 1 to 3 kilovolts whereas the battery 26 has a potential of the order of 10 to 20 kilovolts.

A deflection yoke 28, coupled to horizontal and vertical deflection generators 30 and 32 of conventional design, is provided for deflecting the generated electron beam across the face plate 22 of the cathode-ray tube to form a raster thereon.

Figures 2, 3:
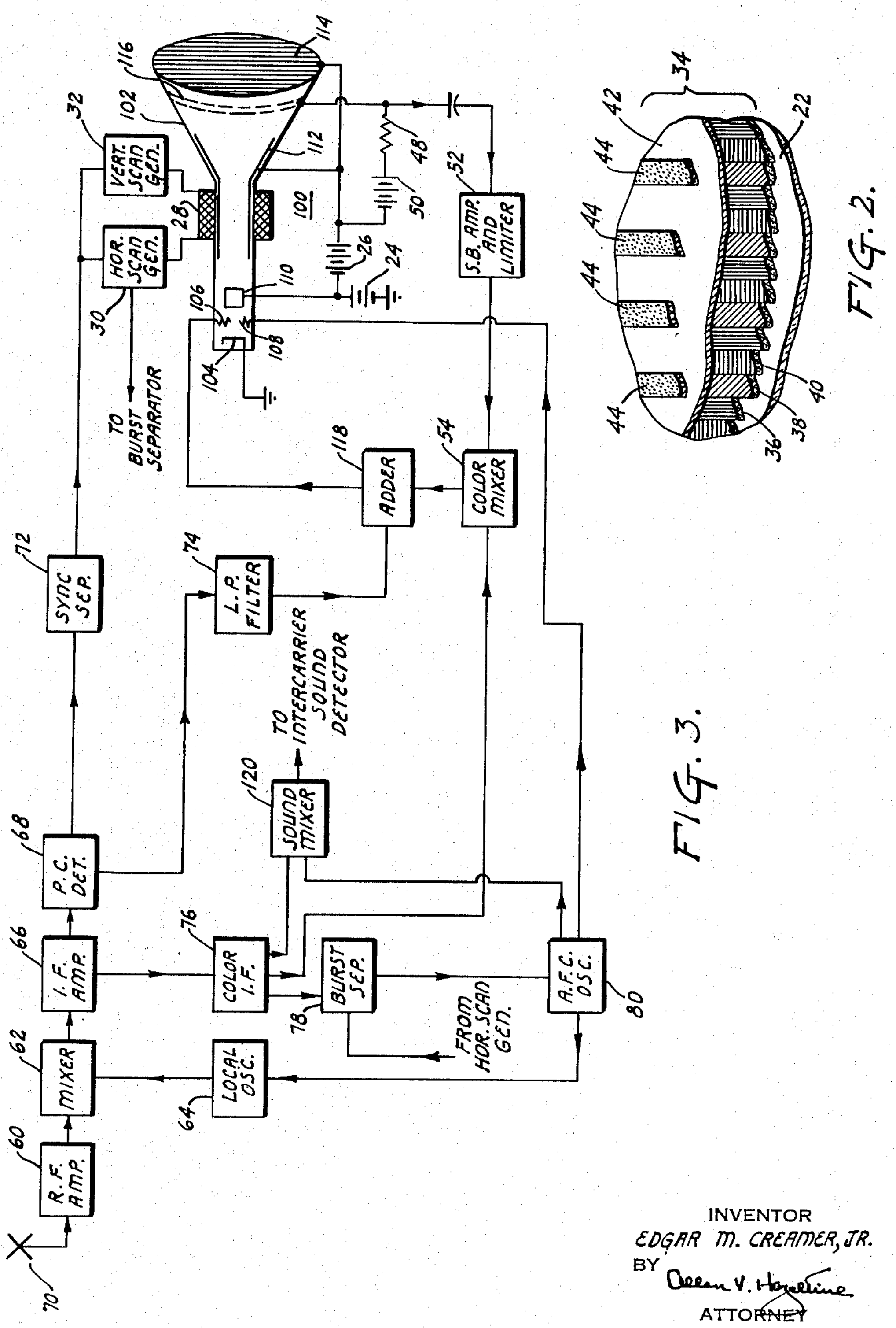
Figure 2 is a cross-sectional view, partly cut away, showing a portion of one form of beam intercepting structure for a cathode-ray tube image reproducer suitable for use in the systems of the invention.
Figure 3 is a block diagram of a color television receiving system in accordance with a second embodiment of the invention.

The end face plate 22 of the tube is provided with a beam intercepting structure 34, one suitable form of which is shown in detail in Figure 2. In the arrangement shown in Figure 2, the structure 34 is formed directly on the face plate 22. However, the structure 34 may alternatively be formed on a suitable light transparent base which is independent of the face plate 22 and may be spaced therefrom. In the arrangement shown, the end face 22, which in practice consists of glass having preferably substantially uniform transmission characteristics for the various colors in the visible spectrum, is provided with a plurality of groups of elongated, parallelly arranged stripes 36, 38 and 40, of phosphor materials which, upon impingement of the cathode beam, fluoresce to produce light of three different primary colors. For example, the stripe 36 may consist of a phosphor which produces red light, the stripe 38 may consist of a phosphor which produces green light, and the stripe 40 may consist of a phosphor which produces blue light. Each of the groups of stripes may be termed a color triplet and, as will be noted, the sequence of the stripes is repeated in consecutive order over the area of the area of the structure 34. Suitable materials constituting the phosphor stripes 36, 38 and 40 are well known to those skilled in the art, as well as methods of applying the same to the face plate 22, and further details concerning the same are believed to be unnecessary.

In the arrangement specifically shown, the indexing signal is produced by utilizing indexing stripes of a given secondary-emissive ratio differing from the secondary-emissive ratio of the remainder of the beam intercepting structure and for this purpose the structure 34 further comprises a thin electron permeable conducting layer 42 of low secondary-emissivity. The layer 42 is arranged on the phosphor stripes 36, 38 and 40, and preferably further constitutes a mirror reflecting light generated at the phosphor stripes. In practice the layer 42 is a light reflecting aluminum coating which is formed in well known manner. Other metals capable of forming a coating in the manner similar to aluminum, and having a secondary-emissive ratio detectably distinct from that of the material of the indexing member, may also be used. Such other metals may be, for example, magnesium or beryllium.

Arranged on the coating 42 over consecutive green stripes 38 are indexing stripes 44 consisting of a material having a secondary-emissive ratio detectably different from that of the material of coating 42. The stripes 44 may consist of gold or other high atomic number metals such as platinum or tungsten or of an oxide such as magnesium oxide as previously pointed out.

The beam intercepting structure so constituted is connected to the positive pole of the battery 26 by means of a suitable lead attached to the aluminum coating 42.

Interposed between the end of the accelerating anode 20 and the beam intercepting structure 22 is an output collector electrode 46 consisting of a ring shaped coating for example, of graphite or of silver, on the wall of the envelope. Electrode 46 is energized through a load resistor 48 by a suitable source 50, shown as a battery. The source 50 may have a potential of the order of 3 kilovolts.

The cathode-ray beam in its horizontal travel across the beam intercepting structure 34 impinges successively on the coating 42 and the indexing stripes 44. When the beam is varied in intensity at a pilot frequency rate in a manner later to be more fully pointed out, the scanning beam will generate, across the load resistor 48, an indexing signal made up of a component at the pilot frequency rate and sideband components representing the sum and difference frequencies of the pilot frequency and the rate at which the index stripes are scanned by the cathode-ray beam.

In a typical case, the pilot frequency variations of the intensity of the beam may occur at a frequency of 38.5 mc./sec. and when the rate of scanning the index stripes 44 is approximately 7 million per second, as determined by the horizontal scanning rate and the number of index stripes 44 impinged per scanning period, a modulated signal at 38.5 mc./sec. and having sidebands at approximately 31.5 and 45.5 mc./sec. is produced across the load resistor 48. Changes in the rate of scanning of the index stripes 44 due to non-linearities of the beam deflection and/or to non-uniformities of the spacing of the index stripes will produce corresponding changes in the frequencies of the sidebands. Therefore, the modulated signal produced by the pilot frequency variations of the intensity of the cathode-ray beam or a sideband of this signal may be used as an indexing signal indicative of the position of the beam on the surface of the beam intercepting structure 34. In the arrangement specifically shown in Figure 1, the lower sideband—i. e., the sideband at approximately 31.5 mc./sec.—is utilized as the indexing signal and this signal is applied through a sideband amplifier and amplitude-limiter 52 to a utilization circuit therefor consisting of a mixer 54. Amplifier 52 is of conventional design and is characterized by a band-pass response which transmits and amplifies only signals having a frequency in the range of the above noted lower sideband. The amplifier which may embody conventional amplitude limiting means by which any amplitude modulation appearing on the signal may be removed, is constructed in accordance with known practice to provide the desired amplification without phase modulation or other phase distortion of the signal applied thereto.

For supplying a color video wave to the control grid 16 there is provided a receiver system comprising a radio frequency amplifier 60, mixer 62, an oscillator 64, an intermediate frequency amplifier 66 and a picture carrier detector 68. These elements, with the exception of the local oscillator 64 later to be more fully described, are of conventional design. Radio frequency amplifier 60 is coupled to a suitable antenna system 70 for receiving the transmitted carrier wave bearing the desired video signal as a modulation component thereof.

In a typical form, the incoming video signal comprises time-spaced horizontal and vertical synchronizing pulses recurrent at the horizontal and vertical scanning frequencies, and the color video wave occurring in the intervals between the horizontal pulses. The incoming video signal may further include a marker signal for providing a phase reference for the color signals of the color video wave, such a marker being usually in the form of a burst of a small number of cycles of carrier signal having a frequency equal to the frequency of the chromaticity sub-carrier component of the video wave and occurring during the so-called back porch interval of the horizontal synchronizing pulses.

The video color wave may be formed at the transmitter in a number of different manners. Preferably it is generated at the transmitter in accordance with the principles set forth in the copending application of Frank J. Bingley, Serial No. 225,567, filed May 10, 1951. As described in said application, the image to be televised is resolved into three color signals, one of which is proportional to the energy distribution of the light emitted by the image as weighted by a color mixture curve having a shape and ordinate scale substantially identical to the shape and ordinate scale of the curve of the relative luminosities of the spectral colors to the eye. The second and third color signals are made proportional respectively to the energy distribution of the light emitted by the image as weighted by second and third color mixture curves having shapes and ordinate scales complementing the shape and ordinate scale of the first curve. The first of these signals accordingly defines the brightness of the image elements and is a signal having a relatively large bandwidth, whereas the remaining two signals define with the first signal the chromaticity of the image and need only be of a relatively small bandwidth. In one of the systems specifically described in the said application of Frank J. Bingley, the first of the said signals is utilized directly to form one component of the color video wave without being previously modulated, and the second and third signals, modified by the first signal to produce two difference signals, are modulated in phase quadrature on a sub-carrier to produce the modulated wave component of the color video wave.

In the following discussion of the system of Figure 1 a video color wave is presumed which is constituted as above described and in which the signals defining the brightness and chromaticity of the image elements specify the image colors with respect to the three color primaries X, Y and Z as defined by the ICI.

The transmitted signal may further comprise a sound signal in the form of a modulated carrier arranged adjacent to one end of the frequency spectrum of the video wave—i. e., a modulated carrier spaced at a frequency of 4.5 mc./sec. from the frequency of the picture carrier.

The received carrier wave is heterodyned in the mixer 62 with a beating signal derived from the oscillator 64 to produce an intermediate frequency wave which is applied to the I.-F. amplifier 66. The band-pass characteristics of amplifier 66 are determined by design considerations in conformance with the practice well known in the art, and any suitable I.-F. frequency of a relatively large value may be used. In the specific example herein described, the I.-F. amplifier may have a central frequency of the order of 37 mc./sec. and a bandwidth of the order of 4.5 mc./sec. The band-pass characteristic of a typical amplifier 66 has been shown in Figure 1 by the curve 67 positioned adjacent to the block 66, there being also indicated on the curve the relative positions of the picture carrier PC (the carrier frequency of the I.-F. wave), the color carrier CC (the frequency of the sub-carrier on which the chromaticity information of the image has been modulated) and the sound carrier SC (the frequency of the carrier on which the sound has been modulated). Thus, in a typical case, the video signal in the I.-F. amplifier 66 may have a picture carrier at a frequency of 34.6 mc./sec., a color carrier at 38.5 mc./sec. and a sound carrier at 39.1 mc./sec. as shown.

In accordance with the invention, the low frequency component and the modulated sub-carrier component of the video information are derived from respectively different portions of the receiver and these components are separately processed in individual channels for application to the image reproducer. More specifically, and in the system shown in Figure 1, the I.-F. amplifier 66 energizes a picture carrier detector 68, which may consist of the usual diode detector, and which serves primarily to recover the low frequency component of the video information contained in the intermediate frequency wave appearing in the I.-F. amplifier 66. The modulated sub-carrier component of the video information contained in the intermediate frequency wave is directly derived from the I.-F. amplifier 66 at a point prior to the detector 68 and supplied to an individual channel as later to be more fully pointed out.

Since, in the system of the invention, the low frequency component and the modulated sub-carrier component of the video information are processed in individual channels originating at a point prior to the picture carrier detector 68, the output stage of I.-F. amplifier 66 and/or the input of detector 68 need not have a uniform frequency response over the full bandwidth of the video wave applied to the I.-F. amplifier 66. Accordingly these parts of the system may have a band-pass characteristic as shown by the curve 63.

The pulses for synchronizing the horizontal and vertical scansions of the image appear with the low frequency component of the video signal. These pulses are applied to the horizontal and vertical scanning generators 30 and 32 from the output of detector 68 through a synchronizing signal separator 72. The sound carrier is also derived from the detector 68 and is applied to a suitable intercarrier sound detector (not shown). These components and their interconnections conform to conventional practice well known in the art of "black-and-white" television receivers and a further description thereof is believed to be unnecessary.

The low frequency component of the video wave, which contains the brightness information of the image and which has an extended bandwidth (i. e., up to about 3.5 mc./sec.), is applied as a first input to an adder 75 which in turn is coupled to the intensity control electrode 16 of the cathode-ray tube 10. Preferably, there is arranged between the detector 68 and the adder 75 a low-pass filter 74 of conventional design and having a cut-off frequency at the upper end of the frequency band of the brightness signal, i. e., a cut-off frequency at 3.5 mc./sec. The adder 75 may take any of well known forms, the purpose thereof being to linearly add a plurality of signals applied to the inputs thereof. In a typical form, the adder may consist of a plurality of amplifier tubes having their control grids connected to individual input circuits and having their anodes connected together through a common load impedance.

For individually deriving the color modulated sub-carrier from the intermediate frequency wave, there is coupled to the I.-F. amplifier 66 an I.-F. amplifier 76 serving as a band-pass filter for the color modulated sub-carrier. This amplifier has a transmission characteristic centered at the frequency of the color sub-carrier of the I.-F. wave, i. e., at 38.5 mc./sec. and has a pass-band which is sufficient to include the sidebands of the sub-carrier and which may include, to a limited extent, the sound carrier and its sidebands. The modulated color carrier so derived is heterodyned to a frequency established by the requirements of the tube 10 by means of the mixer 54 in a manner later to be more fully described, and the heterodyned signal so produced is applied as a second input to the adder 75 energizing the control electrode 16 of the tube 10.

It will be noted that, since the color marker signal of the originally generated video signal has the same frequency as the color sub-carrier, and hence appears in the amplifier 66 at the frequency of the color sub-carrier therein, the marker signal also will be transmitted through the color amplifier 76. In the system of the invention this marker signal serves to produce the pilot signal previously referred to, by means of which the beam of the cathode-ray tube 10 is varied in intensity at a pilot frequency rate to thereby generate at the output of the tube an indexing signal indicative of the position of the beam. For generating such a pilot signal there is coupled to the output of the amplifier 76 a burst separator 78 which operates to separate the marker signal from the color sub-carrier by providing a gated path for the applied input signal during the time of occurrence of the marker signal. Such a gate may consist, for example, of a dual grid electron discharge tube having one control grid which is coupled to the amplifier 76 and a second control grid so negatively biased as normally to prevent conduction through the tube. The tube is made conductive at the proper instant, i. e., during the back-porch interval of the horizontal synchronizing pulses, by means of a positive pulse which may be derived from the output of the horizontal scanning generator 30 in well known manner, and which is applied to the said second control grid to override the normal blocking bias. The burst separator may also contain a filter for attenuating undesirable signals at the output thereof, i. e., the separator 78 may contain a resonant circuit which is tuned to the frequency of the marker signal and which is connected to the anode of the tube.

The marker signal so provided may then be applied to a controlled oscillator system 80 adapted to generate the desired pilot signal having a frequency and phase position as established by the frequency and phase position of the marker signal applied to the input thereof. This pilot signal is applied as a third input to the adder 75 and, as previously described, this signal, in conjunction with the scanning of the index stripes 44 (see Figure 2) by the beam, serves to produce the indexing signal supplied to the mixer 54.

The oscillator 80 may further provide an automatic frequency controlling (AFC) potential having amplitude variations proportional to variations of the frequency of the applied marker signal from a given predetermined established value, i. e., from the value 38.5 mc./sec. given above in connection with typical frequencies of the signals appearing in the I.-F. signal. Such an oscillator and AFC generating system may take any of the well known forms. Conveniently, the oscillator system 80 may comprise an oscillator having circuit constants selected in well known manner so that the free running frequency of the oscillator approximates the said given predetermined frequency value, a reactance tube coupled to the oscillator for varying the frequency and/or phase thereof and a frequency and phase detector coupled to the output of burst separator 78 and to the output of the oscillator and adapted to produce an AFC voltage which is applied to the reactance tube to modify the frequency and phase of the oscillator section in a sense to correct the frequency and phase departures of the oscillator from the desired value. A suitable form for the oscillator system 80 is described in the copending application of Joseph C. Tellier, Serial No. 197,551, filed November 25, 1950.

The AFC voltage produced by the system 80 is also applied to the local oscillator 64 and serves to adjust the frequency of the oscillator 64 relative to the frequency of the received transmitted wave so that the frequency of the color carrier appearing in the amplifiers 66 and 76 approaches closely the desired value. This reduces the pull-in range requirements on the AFC oscillator system 80. The oscillator 64 may be of well known form and in one typical arrangement may comprise an electron discharge tube having input and output electrodes regeneratively coupled by a circuit tuned to approximately the desired operating frequency and may further comprise a voltage-controlled variable reactance, such as a Miller type variable reactance tube, which shunts the tuned circuit and varies the resonant frequency thereof proportionally to the value of the AFC voltage from the oscillator system 80.

Since the information at the output of the low pass filter 74 and the information appearing on the color sub-carrier derived from the color I.-F. amplifier 76 are in terms of the primaries X, Y and Z, it is necessary to modify these signals to make them conform to the particular real primary colors R, G and B characterizing the phosphor stripes utilized in the screen assembly 34 (see Figure 2) of the cathode-ray tube. This may be accomplished by synchronously detecting the color carrier at a particular phase and adding the detection products in proper relative amounts to the imaginary primary signals. For example, as shown in Figure 1, the color sub-carrier from the I.-F. amplifier 76 and a demodulating signal at the color sub-carrier frequency derived from the oscillator system 80 are applied to a mixer 84 and the detected products produced therein are in turn applied as an input signal to the adder 75. The mixer 84 may include a conventional phase shifter for either or both of the input signals thereof to vary the relative phases of the detection signals and may further include an amplifier in the output circuit to establish the amplitude of the output signal at the proper value relative to the amplitudes of the signals supplied to the adder 75 from the detector 68 through the filter 74 and from the I.-F. amplifier 76 through the mixer 54. As will be apparent to those skilled in the art, the actual value of the phase shift and amplification taking place in the mixer amplifier 84 is determined by the particular primary colors reproduced by the cathode-ray tube 10 and these quantities may be readily calculated.

The transformation from the imaginary primary color system to a specific real primary color system may be achieved in ways other than that above specifically described. More particularly, such a transformation may be effected by means of a signal produced as a synchronous detection product of the outputs of amplifier and limiter 52 and of mixer 54, which detection product may be applied as a further input to the adder 75 above described. Furthermore, the stage of the adder 75 to which the oscillator system 80 is coupled could be made non-linear and a signal from the amplifier 76 additionally applied to it. By means of a low-pass and a band-pass filter, in the output circuit of this adder stage, and by reason of the non-linear characteristic of the stage a low frequency heterodyne signal with color information as well as the signal from oscillator 80 is applied to the electrode 16. The heterodyning action could also be accomplished within the tube 10 itself—for example by the use of a tube having a beam generating and control system such as to provide a non-linear, and preferably a square law relationship, between beam-current and control-voltage.

The composite signal supplied from adder 75 to the control grid 16 of the cathode-ray tube 10 comprises a pilot carrier component derived from the oscillator 80, a brightness component derived from the PC detector 68, a color sub-carrier component derived from the mixer 54 and a color matrixing component derived from the mixer 84. As the beam scans the intercepting structure 34 the pilot carrier variations thereof will cooperate with the index stripes of the beam intercepting structure to generate the desired indexing signal in accordance with the principles set forth in the above referred to copending application of E. M. Creamer, et al. Furthermore, the beam will undergo a variation in intensity in conformance with the brightness signal from the detector 68 as modified by the color sub-carrier supplied from the I.-F. amplifier 76 through the mixer 54 and the matrixing component from the mixer 84. It will be noted that, since the pilot carrier variations of the intensity of the cathode-ray beam and the sub-carrier color signal supplied to the mixer 54 are at the same frequency, the heterodyne difference signal produced by mixer 54 has a central frequency equal to the average rate of scanning the index stripes so that the modification of the brightness signal by the color sub-carrier is in synchronism with the scanning of the successive color triplets of the structure 34 of the tube.

In some instances non-linearities of the beam-current versus control-voltage characteristic of the cathode-ray tube may introduce undesired cross-modulation of the applied signals to the detriment of the quality of the index signals generated across the load resistor 48. In such instances it may be desirable to apply an appropriate signal for cancelling these undesired cross-modulation products. Such a cancelling signal may be derived from the beam current of the tube 10, for example, by means of a resistor 82 interconnecting the cathode 14 and a point of the circuit at ground potential, and a cancellation amplifier 84 coupled to the high potential end of resistor 82 and adapted to apply the cancelling signal to the output of the tube in a phase and amplitude such as to cancel the undesired signal generated by reason of the said non-linear characteristic of the tube.

The system of the invention is also applicable to cathode-ray color image reproducers utilizing individual electron beams for developing the color image and the indexing signal. Such an embodiment of the invention is shown in Figure 3 in which, elements which are similar in function and operation to corresponding elements shown in Figure 1, have been indicated by the same reference numerals.

The system shown in Figure 3 comprises a cathode-ray tube 100 containing, within an evacuated envelope 102, a cathode 104 serving as a source for two electron beams, control electrodes 106 and 108 for individually controlling the intensities of the two beams, focusing and beam accelerating electrodes 110 and 112 for the beams, and a collector electrode 116. The tube further comprises an end face 114, the inner surface of which may carry a color image and index signal forming structure similar to that described in connection with the tube shown in Figure 1. A suitable construction for generating and individually controlling the intensity of the two beams is shown and described in the copending application of Melvin E. Partin, Serial No. 242,264, filed August 17, 1951, and further details herein concerning the same are believed to be unnecessary.

The electrode system above described is energized by suitable sources of potential shown as batteries 24, 26 and 50 in the manner previously described, the battery 50 being connected to the collector electrode 116 through a load resistor 48.

A deflection yoke 28 coupled to horizontal and vertical deflection generators 30 and 32 of conventional design is provided for deflecting the two electron beams in synchronism across the image reproducing screen of the cathode-ray tube.

The transmitted carrier wave carrying the color video signal as a modulation product thereof is received by an antenna 70, amplified by an R.-F. amplifier 60 and applied to a mixer 62. By means of a local oscillator 64, the incoming wave is heterodyned by the mixer 62 to a desired intermediate frequency value, and the heterodyne wave so produced is applied to an I.-F. amplifier 66 and thereafter to a picture carrier detector 68.

The arrangement shown in Figure 3 is adapted for the reproduction of a video color wave having brightness and chromaticity information derived directly from real colors of a given primary color system matching the real primaries of the image reproducing tube 100. Such a video color wave may consist, for example, of a low frequency component M of extended bandwidth and defined by the relationship $$\frac{R+G+B}{3}$$

where R, G and B are indicative of the three real primaries, and which thereby establishes the brightness of the image elements. The video wave may further comprise a high frequency component of relatively narrow bandwidth and produced by two further color specifying signals (N–M) and (O–M) modulated in a given phase relationship, usually in quadrature, on a suitable sub-carrier. The values N and O are established, as previously described, on the basis of the particular real primaries selected at the transmitter, and are so constructed from the real primaries as to complement the color defining values of the signal M.

Coupled to the I.-F. amplifier 66 is a picture carrier detector 68 by means of which the low frequency component of the video information is derived from the intermediate frequency wave independently of the color modulated sub-carrier component. The so detected video signal is applied to a synchronizing signal separator 72 which in turn energizes the horizontal and vertical scanning generators 30 and 32, and is further applied to a low-pass filter 74 which suppresses any existing color sub-carrier of the video wave and transmits to an adder 118 the lower frequency and extended bandwidth component of the video signal representative of the brightness information of the image. Adder 18 is in turn coupled to the control electrode 106 of the cathode-ray tube 10. The modulated sub-carrier component of the video information is separately derived from amplifier 66 by means of an I.-F. amplifier 76 having a pass-band centered about the center frequency of the color sub-carrier appearing in I.-F. amplifier 66, which pass-band includes and partially attenuates the sound carrier component of the I.-F. signal. This signal is applied as a first input to a mixer 54, the heterodyne output of which is applied as a second input to the adder 118.

The signal at the output of amplifier 76 is also supplied to a burst separator 78. Burst separator 78 operates in the manner previously described to derive the marker signal from the signal passing through the amplifier 76 in a form free from interference from the video color information and substantially free from noise. The separated marker signal is thereafter applied to the AFC oscillator system 80 which in turn supplies an AFC voltage to the local oscillator 64 to adjust the frequency thereof relative to the frequency of the received transmitted wave so that the color carrier appearing in the amplifiers 66 and 76 approaches closely the desired value. The oscillator system 80 further provides a pilot signal at the frequency of the marker signal, which signal is applied to the control grid 108 of the cathode-ray tube 100 and thereby varies the intensity of the beam associated therewith at the pilot frequency. The so modulated beam, when scanned across the index stripes of the beam intercepting structure formed on the face plate 114, generates across load resistor 48 a modulated signal having a carrier frequency of the frequency of the pilot signal applied to control grid 108 and having sidebands as determined by the rate at which the beam scans the index stripes. Thus, for a pilot frequency of 38.5 mc./sec. and a stripe scanning rate equal to approximately seven million per second, the signal produced across resistor 48 has a carrier frequency at 38.5 mc./sec. and sidebands at approximately 31.5 and 45.5 mc./sec. Any departures of the index stripe scanning rate due to nonlinearities of the deflection system etc., will be indicated as a change in the frequency of the sidebands and accordingly, the generated signal or a sideband thereof may be used as an indexing signal indicating the position of the electron beam on the beam intercepting structure. Furthermore, since the beams under the control of electrodes 106 and 108 are under the influence of a common deflecting means, these beams move in synchronism and thus the abovementioned index signal is also an indicator of the position of the beam under the control of electrode 106.

In the system shown, the lower sideband of the generated signal is utilized as an index signal and this lower sideband is selected by the sideband amplifier and limiter 52 and applied to mixer 54.

The heterodyne difference signal produced by the mixer 54 consists of a color modulated carrier having a frequency equal to the difference frequency of the applied color carrier and the applied index signal. As previously pointed out, this heterodyne signal undergoes phase and/or frequency variations as determined by the phase and/or frequency variations of the index signal applied to mixer 54. Therefore, this heterodyne signal varies in synchronism with the scanning of the beams over the phosphor stripes of the image producing screen of the cathode-ray tube.

The arrangement shown in Figure 3 provides an alternate arrangement for deriving the sound carrier from the intermediate frequency wave passing through the amplifier 66. As pointed out above, the amplifier 76 may be sufficiently broad to transmit the sound carrier to a limited extent and therefore in an attenuated form. The sound carrier thus existing in the output of amplifier 76 may be then heterodyned with the pilot signal generated by the oscillator system 80 by means of a mixer 120 to produce a low frequency sound carrier which may then be detected in known manner to recover the sound intelligence. This system for deriving the sound carrier has the advantages that the output sections of the amplifier 66 and of the detector 68 need be designed with a band-pass only sufficient to transmit the M component of the video wave and the synchronizing pulses so that the sound carrier may be readily attenuated and prevented from contaminating the picture signals. Furthermore, since the sound carrier has a relatively low frequency—equal to the difference between the sound and color carriers in the amplifier 66—as compared to a frequency equal to the difference between the sound and picture carriers in amplifier 66, less costly amplifiers may be used for the sound carrier and simpler detector circuits may be used for deriving the sound information.

While I have described my invention by means of specific examples and in specific embodiments, I do not wish to be limited thereto for obvious modifications will occur to those skilled in the art without departing from the spirit and scope of the invention.

What I claim is:

1. A receiving system for reproducing a color television image as defined by a color video wave having first and second components indicative of visual aspects of said image, comprising means to produce a color video signal in the form of a carrier wave having a first modulation signal portion with a given frequency spectrum as determined by said first component and having a second modulation signal portion with a second given frequency spectrum as determined by said second component, said second modulation signal portion being arranged about a sub-carrier wave, a cathode-ray tube system comprising an electron beam intercepting member, means to generate electrons and to direct the same in beam formation toward said intercepting member and means to vary the flow of electrons from said generating means, said intercepting member having first portions thereof arranged in a given geometric configuration and having a first response characteristic upon electron impingement adapted to produce a color television image, said member further having second portions thereof arranged in a second geometric configuration indicative of said first configuration and having a second given response characteristic upon electron impingement different from said first characteristic, means to scan said electrons in beam formation across said intercepting member, means to vary the said flow of electrons from said generating means proportionally to variations of said first component, means to vary the said flow of electrons from said generating means at a rate proportional to the frequency of said sub-carrier wave, means to derive from said intercepting member a control quantity proportional to the said variations of electron flow at the said rate proportional to said sub-carrier frequency and proportional to the rate of scanning said second portions, means to combine said control quantity and said sub-carrier wave to produce a heterodyne signal, and means to apply said heterodyne signal to said electron flow varying means.

2. A receiving system as claimed in claim 1 wherein said first portions of said beam intercepting member each comprise a plurality of stripes of fluorescent material, each of said stripes producing light of a different color in response to electron impingement, and said second portions comprise spaced stripes arranged substantially parallel to said fluorescent stripes.

3. A receiving system as claimed in claim 1 wherein said electron generating and directing means comprise means to generate a single electron beam and to direct said beam towards said beam intercepting member, and wherein said means to vary the flow of electrons from said generating means comprises means to vary the intensity of said beam.

4. A receiving system as claimed in claim 1 wherein said electron generating and directing means comprises means to generate two electron beams and to direct said beams towards said beam intercepting member, and wherein said means to vary the flow of electrons from said generating means comprises means to vary the intensity of one of said beams at a rate proportional to the frequency of said sub-carrier wave and means to vary the intensity of the other of said beams proportionally to variations of said first component and proportionally to variations of said heterodyne signal.

5. A receiving system for reproducing a color television image as defined by a color video wave having a first component defining the brightness of said image and a second component defining with said first component the chromaticity of said image, comprising means to produce an intermediate frequency color video signal in the form of a carrier wave having a first modulation signal portion with a given frequency spectrum as determined by said first component and having a second modulation signal portion with a second given frequency spectrum as determined by said second component, said second signal portion being arranged about a sub-carrier wave and said second spectrum being arranged at one end of said first spectrum, a cathode-ray tube comprising an electron beam intercepting member, means to generate electrons and to direct the same in beam formation toward said intercepting member and means to vary the flow of electrons from said generating means, said intercepting member comprising first portions each comprising a plurality of stripes of fluorescent material arranged in substantially parallel relationship, each of said stripes producing light of a different color in response to electron impingement, said member further comprising second stripe portions spaced apart and substantially parallel to said fluorescent stripes and having a response characteristic upon electron impingement different from the response characteristic of said first portions, means to scan said electrons in beam formation across said beam intercepting member, detector means for deriving said first component from said intermediate frequency signal, means to apply said first component to said electron flow varying means, means to vary the flow of electrons from said generating means at a rate proportional to the frequency of said sub-carrier wave, means to derive from said intercepting member a control quantity proportional to the said variations of the electron flow at the said rate proportional to said sub-carrier frequency and proportional to the rate of scanning said second stripe portions, means to combine said control quantity and said sub-carrier wave to produce a heterodyne signal, and means to apply said heterodyne signal to said electron flow varying means.

6. A receiving system as claimed in claim 5 wherein said color video signal further comprises a marker signal having a frequency equal to the frequency of said sub-carrier wave, and wherein said means to vary the flow of electrons from said generating means at a rate proportional to the frequency of said sub-carrier wave comprises a source of an oscillation wave and means to apply said marker signal to said oscillation source as a synchronizing control quantity.

7. A receiving system as claimed in claim 6 wherein said intermediate frequency signal further comprises a second sub-carrier wave having a spectrum contiguous to the spectrum of the sub-carrier wave of said second component, and further comprising means to combine said second sub-carrier wave and said oscillation wave to produce a second heterodyne wave.

8. A receiving system as claimed in claim 6 wherein said means to produce said intermediate frequency carrier wave comprises a local oscillator, and further comprising means to produce a control quantity having a value proportional to variations of the frequency of said marker signal from a given predetermined value, and means to vary the frequency of said local oscillator proportionally to the value of said control quantity.

9. A receiving system as claimed in claim 6 further comprising means to derive from said sub-carrier wave a color matrixing signal, and means to apply said matrixing signal to said electron flow varying means.

10. A receiving system as claimed in claim 6 further comprising means to synchronously detect said sub-carrier wave at the rate of said oscillation wave to produce a color matrixing signal, and means to apply said matrixing signal to said electron flow varying means.

11. A receiving system for reproducing a color television image as defined by a color video wave having a first component defining substantially the brightness of said image and a second component defining with said first component the chromaticity of said image, said system comprising a local oscillator for producing an intermediate frequency color video signal in the form of a carrier wave having a first modulation signal portion with a given frequency spectrum as determined by said first component, having a second modulation signal portion with a second given frequency spectrum as determined by said second component, and having a marker signal component, said second signal portion being in the form of a modulated sub-carrier wave having a spectrum arranged at one end of said first spectrum and said marker signal having a frequency equal to the frequency of said sub-carrier wave, a cathode-ray tube comprising an electron beam intercepting member, means to generate an electron beam and to direct the same toward said intercepting member and means to vary the intensity of said beam, said intercepting member comprising first portions each comprising a plurality of stripes of fluorescent material arranged in substantially parallel relationship, each of said stripes producing light of a different color in response to electron impingement, said member further comprising second stripe portions spaced apart and arranged substantially parallel to said fluorescent stripes and having a given response characteristic upon electron impingement different from the response characteristic of said first portions, means to scan said beam across said intercepting member, detector means for deriving said first component from said intermediate frequency signal, means to derive said modulated sub-carrier wave component and said marker signal from said intermediate frequency signal, an oscillation source for producing a pilot wave at a frequency synchronous with the frequency of said marker signal, means to derive from said beam intercepting member a control quantity having a freqency proportional to the frequency of said pilot wave and to the rate of scanning said second portions, means to combine said derived modulated sub-carrier wave component and said control quantity to produce a heterodyne signal, means to apply said derived first component, said pilot wave and said heterodyne signal to said beam intensity variation means, means for producing a second control quantity having a value proportional to deviations of the frequency of said derived marker signal from a predetermined given frequency value, and means for applying said second control quantity to said local oscillator to thereby vary the frequency thereof in a sense opposing the deviations of the frequency of said marker signal from said given frequency value.

12. A receiving system for reproducing a color television image as defined by a color video wave having a first component defining substantially the brightness of said image and a second component defining with said first component the chromaticity of said image, said system comprising a local oscillator for producing an intermediate frequency color video signal in the form of a carrier wave having a first modulation signal portion with a given frequency spectrum as determined by said first component, having a second modulation signal portion with a second given frequency spectrum as determined by said second component and having a third portion in the form of a marker signal, said second signal portion being in the form of a modulated sub-carrier wave having a spectrum arranged at one end of said first spectrum and said marker signal having a frequency equal to the frequency of said sub-carrier wave, a cathode-ray tube comprising an electron beam intercepting member, means to generate two electron beams and to direct the same toward said intercepting member and means to individually control the intensities of said beams, said intercepting member comprising first portions each comprising a plurality of stripes of fluorescent material arranged in substantially parallel relationship, each of said stripes producing light of a different color in response to electron impingement, said member further comprising second stripe portions spaced apart and arranged substantially parallel to said fluorescent stripes and having a given response characteristic upon electron impingement different from the response characteristic of said first portions, means to scan said beams in synchronism across said intercepting member, detector means for deriving said first component from said intermediate frequency signal, means to derive said modulated sub-carrier wave component and said marker signal from said intermediate frequency signal, an oscillation source for producing a pilot wave at a frequency synchronous with the frequency of said marker signal, means to apply said pilot wave to said intensity varying means of one of said beams, means to derive from said intercepting member a control quantity having a frequency proportional to the frequency of said pilot wave and to the rate of scanning said second portions, means to combine said derived modulated sub-carrier wave component and said control quantity to produce a heterodyne signal, means to apply said derived first component and said heterodyne signal to the intensity varying means of the other of said beams, means for producing a second control quantity having a value proportional to deviations of the frequency of said derived marker signal from a predetermined given frequency value, and means for applying said second control quantity to said local oscillator to thereby vary the frequency thereof in a sense opposing the deviations of the frequency of said marker signal from said given frequency value.

13. A receiving system as claimed in claim 12 wherein said intermediate frequency signal further comprises a second sub-carrier wave having a spectrum contiguous to the spectrum of the sub-carrier wave of said second component, and further comprising means to combine said second sub-carrier wave and said pilot wave to produce a second heterodyne wave.

References Cited in the file of this patent

UNITED STATES PATENTS

| Number | Name | Date |
|---|---|---|
| 2,415,059 | Zworykin | Jan. 28, 1947 |
| 2,539,440 | Labin | Jan. 20, 1951 |
| 2,539,465 | Parker | Jan. 30, 1951 |
| 2,558,489 | Kalfaian | June 26, 1951 |